United States Patent
Moss et al.

(10) Patent No.: US 10,001,151 B2
(45) Date of Patent: Jun. 19, 2018

(54) AIR FLOW HOOD

(71) Applicant: Dwyer Instruments, Inc., Michigan City, IN (US)

(72) Inventors: Robert Austin Moss, Saint Joseph, MI (US); Alejandro Ignacio Baez Guada, Chicago, IL (US)

(73) Assignee: Dwyer Instruments, Inc., Michigan City, IN (US)

( * ) Notice: Subject to any disclaimer, the term of this patent is extended or adjusted under 35 U.S.C. 154(b) by 185 days.

(21) Appl. No.: 15/050,813

(22) Filed: Feb. 23, 2016

(65) Prior Publication Data
US 2016/0252114 A1 Sep. 1, 2016

Related U.S. Application Data

(60) Provisional application No. 62/121,222, filed on Feb. 26, 2015.

(51) Int. Cl.
| | |
|---|---|
| *F15D 1/02* | (2006.01) |
| *F24F 13/06* | (2006.01) |
| *G01F 1/684* | (2006.01) |

(52) U.S. Cl.
CPC ............... *F15D 1/02* (2013.01); *F24F 11/74* (2018.01); *F24F 13/06* (2013.01); *G01F 1/684* (2013.01); *F24F 2110/30* (2018.01); *F24F 2221/14* (2013.01)

(58) Field of Classification Search
CPC . F15D 1/02; F24F 11/025; F24F 13/06; F24F 2011/0038; F24F 2221/14; G01F 1/684
See application file for complete search history.

(56) References Cited

U.S. PATENT DOCUMENTS

| | | | | |
|---|---|---|---|---|
| 3,685,355 A | * | 8/1972 | DeBaun | G01F 1/36 73/861.66 |
| 3,733,900 A | * | 5/1973 | De Baun | G01F 1/40 138/37 |
| 3,748,901 A | * | 7/1973 | DeBaun | G01F 1/40 73/861.66 |
| 4,030,358 A | * | 6/1977 | Noll | G01P 5/00 73/861.66 |
| 4,481,829 A | * | 11/1984 | Shortridge | G01F 1/46 73/861.66 |

(Continued)

FOREIGN PATENT DOCUMENTS

| | | |
|---|---|---|
| EP | 2557368 A1 | 2/2013 |
| WO | 2008115138 A1 | 9/2008 |

OTHER PUBLICATIONS

Partial International Search Report to corresponding International Application No. PCT/US2016/019069, 2 pages.

*Primary Examiner* — Lisa Caputo
*Assistant Examiner* — Nathaniel T Woodward
(74) *Attorney, Agent, or Firm* — Tarolli, Sundheim, Covell & Tummino LLP

(57) ABSTRACT

An apparatus for measuring airflow through a diffuser of an HVAC system includes a hood for being positioned adjacent the diffuser so that airflow discharged from the diffuser is directed into the hood. The hood is configured to divide and direct the airflow through a plurality of discharge channels. Sensor probes measure the airflow through each discharge channel.

25 Claims, 16 Drawing Sheets

(56) References Cited

U.S. PATENT DOCUMENTS

| | | | | |
|---|---|---|---|---|
| 5,667,189 | A * | 9/1997 | Kester | F24F 11/04 248/125.8 |
| 5,786,525 | A * | 7/1998 | Freund | F24F 3/044 73/1.34 |
| 6,439,061 | B1 * | 8/2002 | Nelson | G01F 1/46 73/861.65 |
| 7,344,089 | B1 * | 3/2008 | Sutterfield | F24F 11/0086 165/209 |
| 7,706,673 | B1 * | 4/2010 | Staudinger | F16M 11/2021 348/211.2 |
| 2005/0279844 | A1 * | 12/2005 | Bagwell | B08B 15/00 236/49.3 |
| 2009/0241688 | A1 * | 10/2009 | Reichel | G01F 15/063 73/861.65 |
| 2012/0046792 | A1 * | 2/2012 | Secor | F24F 11/0086 700/276 |
| 2012/0267502 | A1 * | 10/2012 | Ileogben | F16M 11/24 248/346.06 |
| 2015/0198468 | A1 * | 7/2015 | Brugger | G01F 1/05 73/861 |

* cited by examiner

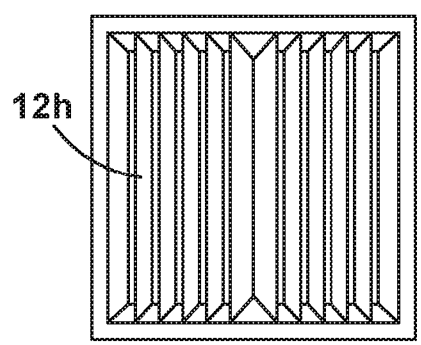
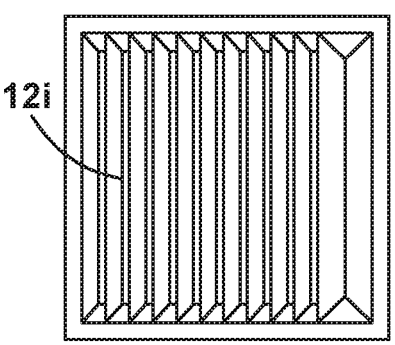
Fig. 11H   Fig. 11I
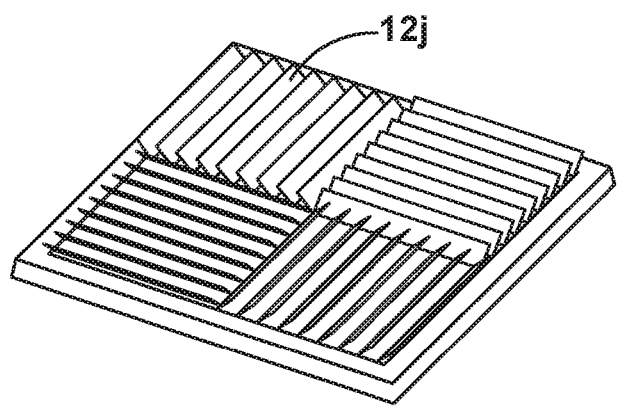
Fig. 11J

AIR FLOW HOOD

RELATED APPLICATIONS

This application claims the benefit of U.S. Provisional Application Ser. No. 62/121,222, which was filed on Feb. 26, 2015, and the subject matter of which is hereby incorporated by reference in its entirety.

TECHNICAL FIELD

The present disclosure is directed to air velocity sensing. More specifically, the present disclosure is directed to an air flow hood, direct reading hood, or balometer used to measure airflow from diffusers in heating, ventilation, and air conditioning (HVAC) systems in commercial buildings or similar structures.

BACKGROUND

Architects and engineers that design HVAC systems for commercial buildings and other structures go to great lengths to ensure that those systems provide a consistent and reliable level of comfort to the occupants of those structures. HVAC designers carefully size the HVAC units to ensure delivery of the appropriate volume of conditioned air. Additionally, they design the ductwork to distribute the conditioned air to the various rooms and other areas of the structure at adequate rates and proportions. Furthermore, the designers select the spacing and configuration of the diffusers, registers, or terminals through which airflow is discharged (hereafter referred to generally as "diffusers") to distribute and disperse the conditioned air into the rooms/areas so as to provide the desired level of comfort for the occupants.

Integral to this design is the need for the conditioned air to be dispersed from each diffuser at a volumetric flow rate that is at or within a predetermined range of a rate specified by the designer. Flow rates that deviate from those specified by the designers will result in room or area temperatures that deviate from the target temperature set at the controller/thermostat, which can compromise the comfort of the building occupants.

When new commercial HVAC systems are commissioned, the system requires balancing to ensure that the conditioned air is delivered from each diffuser at a volumetric flow rate that is at or within a range specified by the system designers. Balancing can also be required as a part of routine HVAC system maintenance or when the floor plan within a building is reconfigured.

Balancing a commercial HVAC system is not a trivial matter and requires the services of a qualified HVAC technician. Commercial HVAC duct runs can be complicated and can have many branches or zones, each of which has many diffusers, or nodes. Not only does each diffuser have its own damper for adjusting flow through that particular node, there are also dampers within the ductwork that can be used to control airflow to the various zones within the system. Once one considers that adjusting a damper for any zone or node will necessarily create a change in backpressure that affects the airflow through all other zones and nodes in the system, the complexity of the balancing task becomes clear.

Ceiling mounted diffusers of commercial HVAC systems are selected by the system designer from a finite number of configurations to diffuse and direct conditioned air into the building space in a predetermined pattern. While there are many different diffuser configurations from which to choose, a vast majority of the diffuser designs fall within or are based around a standard 24-inch by 24-inch footprint common to commercial drop ceiling tiles.

The National Environmental Balancing Board ("NEBB") is an international certification association that, among other functions, certifies individuals and firms to commission, test, adjust, and balance HVAC systems. In addition to certifications, NEBB also provides equipment specifications and procedural standards. On the equipment side, one piece of equipment for which NEBB issues specifications is referred to a direct reading hood, which is used to measure air flow through a ceiling mounted diffuser. In this description, the more generic term "air flow hood" is used to describe a most commonly used form of a direct reading hood device. Those skilled in the art will appreciate that "direct reading hood" and "air flow hood," as used in this description, are essentially interchangeable, i.e., the air flow hood described herein can be characterized as a direct reading hood within the NEBB specification.

Air flow hoods are instruments that are used by HVAC technicians to measure the airflow discharged through ceiling mounted diffusers of commercial HVAC systems. Air flow hoods are designed to be held in place over the diffuser. The hood acts as a duct that collects and redirects the air that is discharged from the diffuser. The air flow hood has the configuration of a converging-diverging nozzle with a throat through which the conditioned air is directed in order to measure its volumetric flow rate. Differential pressure is measured across an averaging pitot tube manometer located in the throat.

Averaging pitot tube manometers used in conventional air flow hoods typically include a plurality of tubes arranged in an array across the throat. The tubes define two channels (one for averaging upstream pressure and one for averaging downsteam pressure) that are fluidly connected to a single manometer. Ports spaced about the tubes face in upstream and downstream directions in the hood and are connected to the upstream and downstream channels, respectively. The airflow in the hood therefore creates a velocity pressure across the pitot tube array, with the high side total pressure being averaged by the upstream channel and the low side static pressure being averaged by the downstream channels. The intent is that, since the ports are spaced about the array, which extends across the cross section of the throat, the velocity pressure sensed via the array is an average velocity in the throat. This average velocity pressure can be used to calculate an average air velocity through the hood, from which a volumetric flow rate can be calculated.

Averaging pitot tube array manometers can be susceptible to errors. The differential pressures measured across the averaging pitot tube are very sensitive to variances in air velocity across the many ports, which can relieve pressure at some of the openings. This can be the case, for example, with highly non-uniform flow concentrations, where areas of relatively high or low concentrations happen to be located in the area of the pitot tube ports. In either case, the measured differential pressure will not produce an accurate airflow measurement.

Regardless of the particular configuration of the HVAC diffuser, the conventional air flow hood collects the discharged air and redirects the air toward the throat where the differential pressure measurements used to calculate the volumetric airflow through the air flow hood are taken. This collection and redirection, however, reduces the airflow rate through the hood, which creates backpressure in the HVAC system. As a result of this backpressure created by the air flow hood, airflow through the diffuser is reduced. Left unchecked, this will produce a corresponding error in the air flow hood airflow reading. Realizing that the differential pressures measured with a air flow hood can necessarily require a resolution of up to 0.001 inches of water column (IWC), these errors can become significant.

Additionally, conventional air flow hoods typically have an open cross section and the air directed through the hood is free to follow whatever flow path and pattern that physics dictates. Because of this, the bulk flow through the air flow hood is not uniform across the cross section of the hood, and the accuracy of the flow measurement can suffer. The redirection of flow in the hood can cause recirculation patterns in some regions of the hood, for example toward the middle regions of the hood, while the majority of the bulk flow is directed along other regions of the hood, such as along the sides. The conventional air flow hood thus can suffer from a lack of mixing, wherein the flow has a more blended, uniform flow pattern across the cross section of the hood.

Furthermore, the non-uniformity of the flow through the air flow hood will change depending on the configuration of the diffuser discharging the air. Because the averaging pitot tube manometers in the conventional air flow hood have fixed positions within the cross section of the hood, the accuracy of the net pressure measured can vary substantially with varying velocity profiles and the flow calculations resulting from these measurements, are unreliable and left to chance. In view of the above, it is readily apparent that the conventional air flow hood suffers from inaccuracies due to non-uniformity of flow and due to flow variances brought about by different diffuser configurations.

SUMMARY

An apparatus for measuring airflow through a diffuser of an HVAC system includes a hood for being positioned adjacent the diffuser so that airflow discharged from the diffuser is directed into the hood. The hood is configured to divide and direct the airflow through a plurality of discharge channels. Sensor probes measure the airflow through each discharge channel.

According to one aspect, the sensor probes can include hot point anemometer sensors.

According to another aspect, the hood can include flow disrupting structures for mixing and distributing the airflow evenly throughout the discharge channels. The flow disrupting structures can comprise turbulators. Each flow disrupting structure can include a plurality of tooth-shaped fins arranged in saw tooth-like rows. The flow disrupting structures can be positioned adjacent inlets of the discharge channels.

According to another aspect, the hood can include internal walls that divide the airflow and funnel the airflow into the discharge channels. The internal walls can have a peaked configuration and slope in a converging manner toward the discharge channels. The hood can include an upper portion that defines an open space into which airflow is discharged. The internal walls and the discharge channels can be positioned downstream of the upper portion.

According to another aspect, the hood can include four quadrants through which the divided airflow is directed. Each quadrant can include one of the discharge channels. The hood can further include internal walls that help define the quadrants and that divide the airflow in the hood and funnel the airflow into the discharge channels.

According to another aspect, each quadrant can include at least one flow disrupting structure for mixing and distributing the airflow evenly throughout the discharge channels. The flow disrupting structures can be positioned adjacent inlets of the discharge channels.

According to another aspect, the apparatus can include a planar surface, positioned in an upper portion of the hood, which streamlines and directs the airflow toward the discharge channels. The planar surface can reduce the volume of the upper portion and thereby help prevent swirling in the airflow in the upper portion of the hood. The planar surface can be an upper portion of a cover under which instrumentation and electronics are located. The instrumentation can include at least one of pressure and temperature transducers.

According to another aspect, the apparatus can also include electronics for interrogating the sensor probes and transmitting wireless signals comprising measurement data obtained via the sensor probes. The apparatus can also include a smart device for receiving the wireless signals and processing the measurement data to provide airflow measurement data for the diffuser. The smart device can include one of a smart phone or tablet equipped with an application for processing the airflow measurement data and comprising a graphical user interface for displaying information related to the measurement data and the HVAC system.

According to a further aspect, the apparatus can include a pole mounting structure located centrally on an underside of the hood. The pole mounting structure can be adapted to receive a pole that a user can manipulate to maneuver the hood to a desired position adjacent the diffuser. The pole mounting structure can include a swivel mechanism for permitting the pole to pivot relative to the hood. The pole can have a telescoping construction that permits the length of the pole to be adjusted in order to facilitate positioning the hood adjacent the diffuser while positioning a base of the pole against a surface so that the surface supports at least a portion of the weight of the hood. The pole can include a handle that the user can grasp to maneuver the hood. The handle can include a trigger actuatable via finger to provide a wireless signal for activating system electronics.

A method for measuring airflow through a diffuser of an HVAC system includes gathering the airflow discharged from the diffuser, dividing the airflow, directing the divided airflow through a plurality of discharge channels, and measuring the airflow through each discharge channel.

According to one aspect, the method also includes disrupting the airflow to mix and distributing the airflow evenly throughout the discharge channels.

According to another aspect, the method also includes streamlining the airflow in the region close to the diffuser and directing the airflow toward structure for dividing the airflow.

BRIEF DESCRIPTION OF THE DRAWINGS

The present invention is illustrated by way of example and not limitation in the figures of the accompanying drawings, in which like references indicate similar elements and in which:

FIGS. 11A-11J illustrate examples of HVAC diffusers, the airflow through which the system of FIGS. 1-10 can be used to measure.

DESCRIPTION

Figure 1:
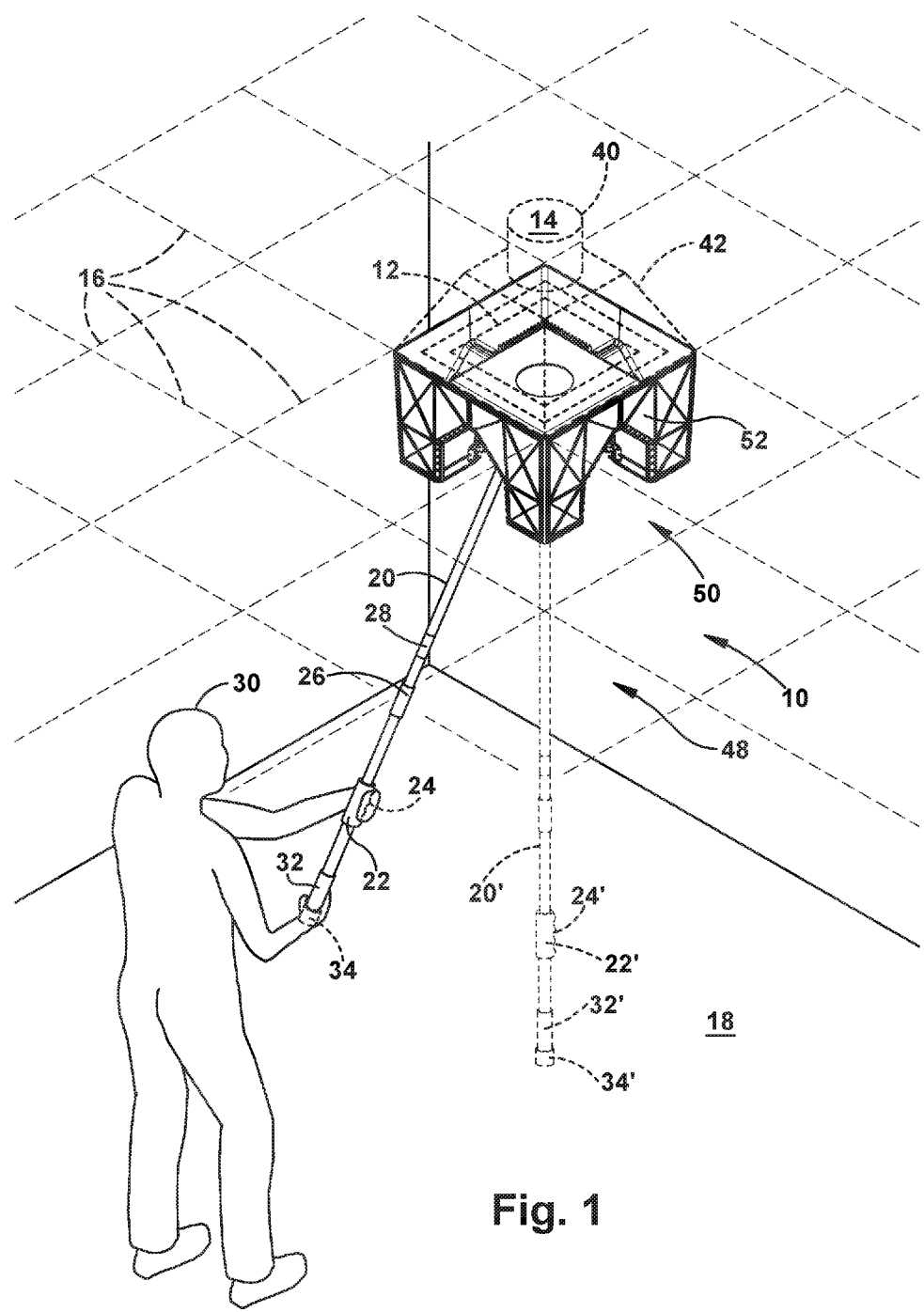
FIG. 1 is a perspective illustration of a system for measuring airflow discharged from an HVAC diffuser, according to the invention.
Figure 2:
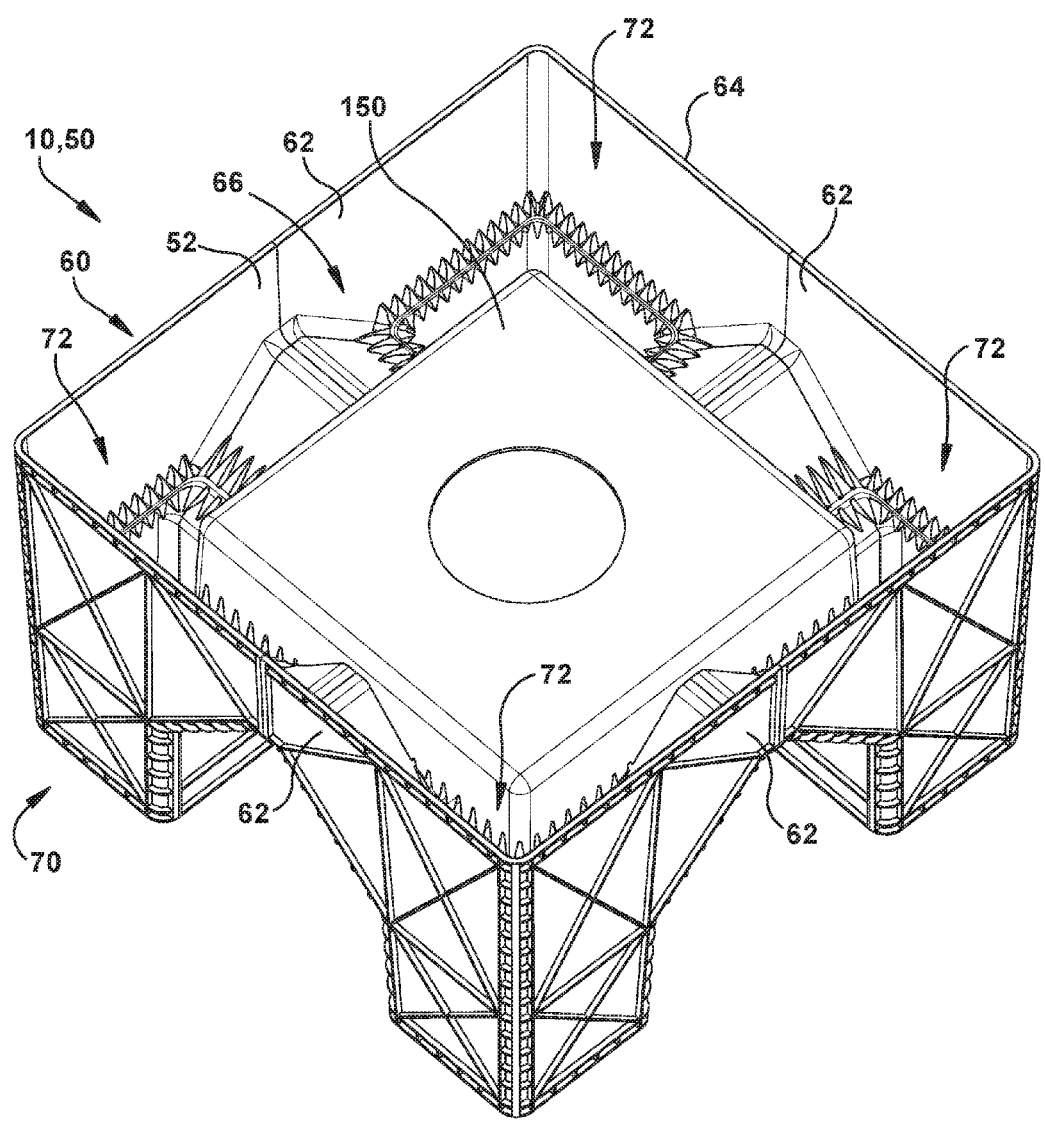
FIG. 2 is a perspective top view of a portion of the system illustrated in FIG. 1.
Figure 3:
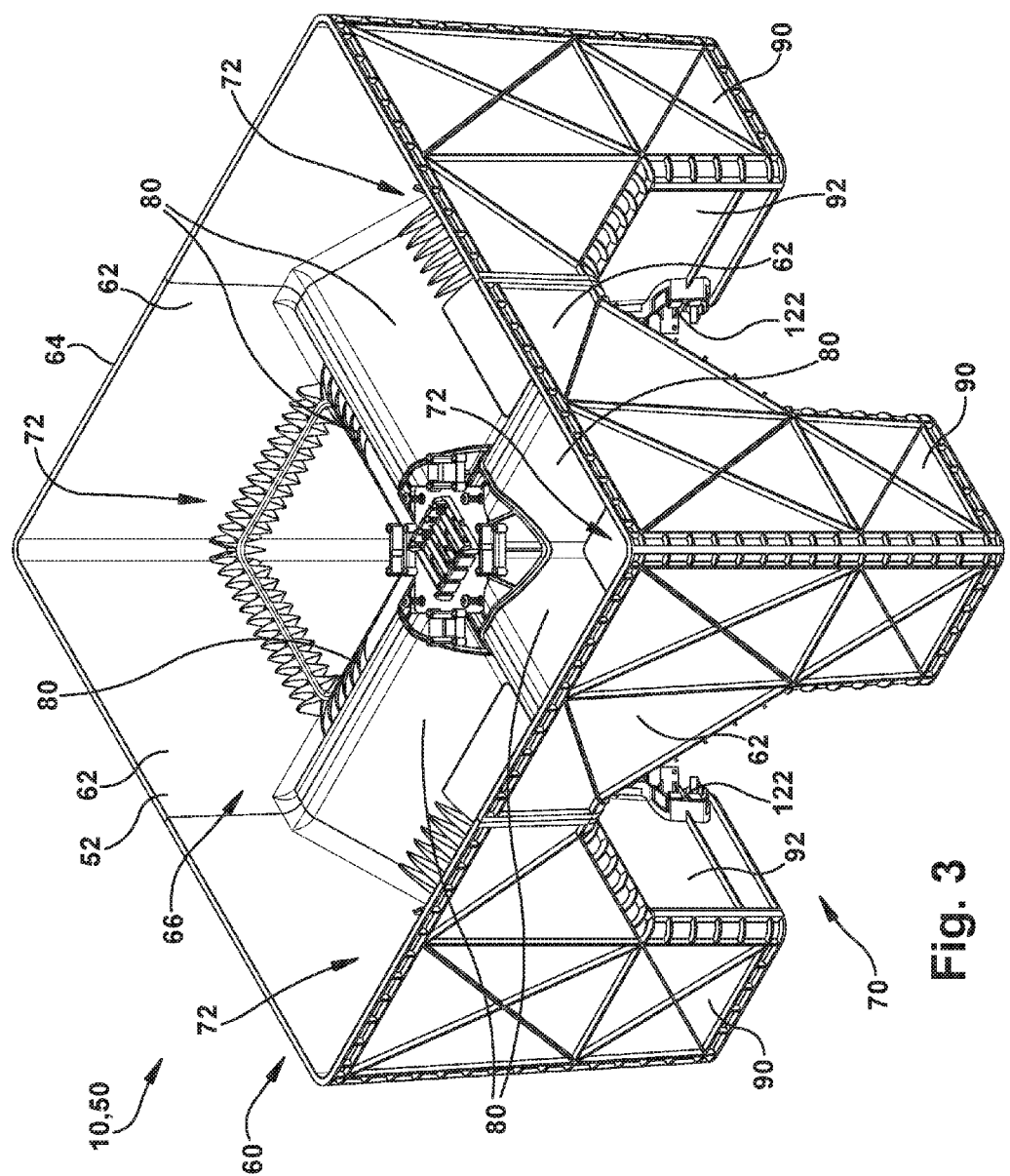
FIG. 3 is a perspective top view of the portion of the system illustrated in FIG. 2 with certain parts removed.
Figure 4:
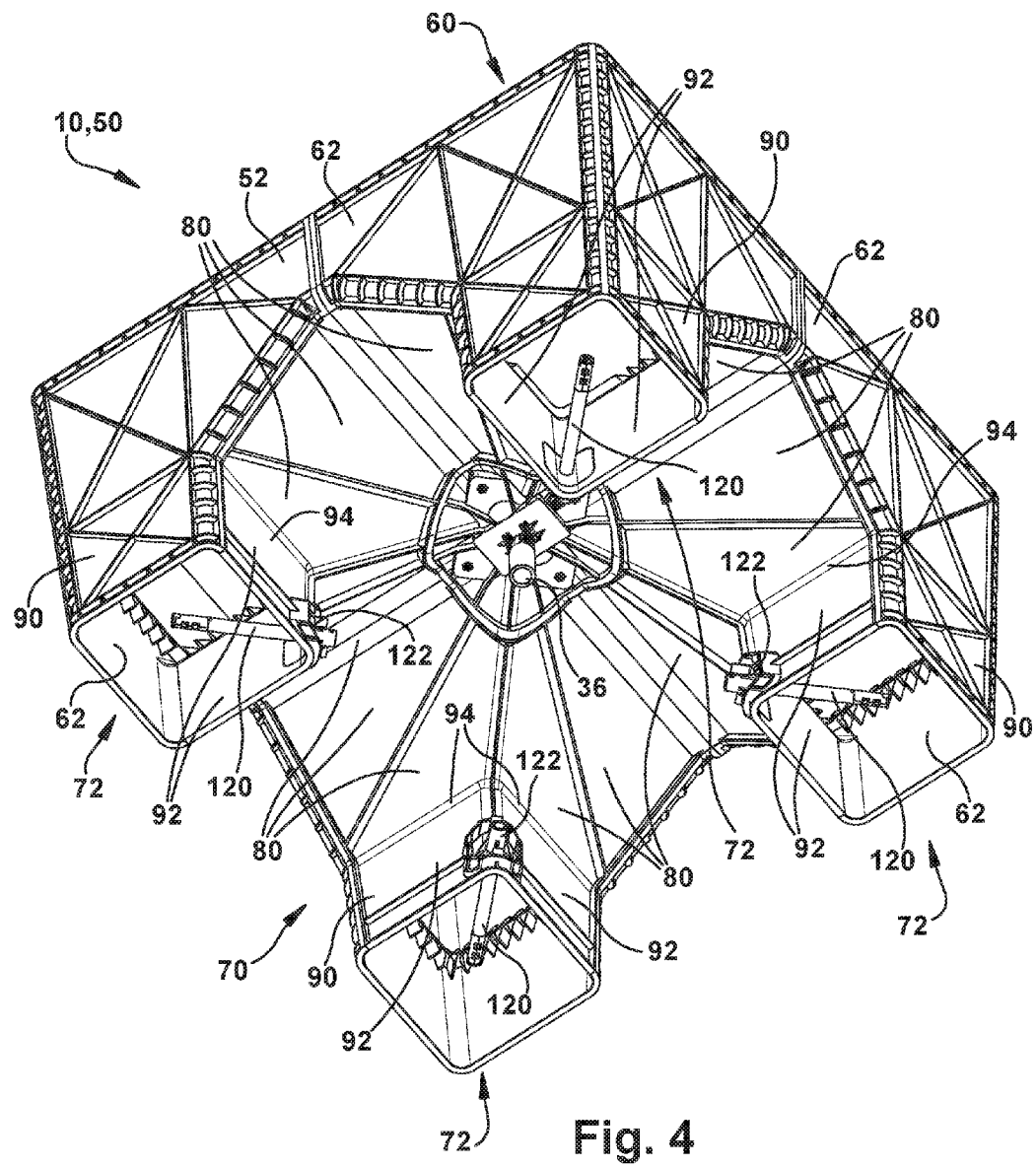
FIG. 4 is a perspective bottom view of the portion of the system illustrated in FIG. 2.

Referring to FIG. 1, a system 10 for measuring airflow through a diffuser 12 of an HVAC system 14 includes an apparatus 48 that includes a balometer 50 and a pole 20 upon which the balometer can be mounted. As shown in FIG. 1, the HVAC system 14 can be a commercial HVAC system typically found in commercial buildings, such as office buildings, and the diffuser 12 can be one that is used in the drop ceiling structures, indicated generally at 16, that are common to the office spaces of those structures. As such, the diffuser 12 can, for example, have a 24×24 inch footprint that is commensurate with the typical grid structure of the commercial drop ceiling 16. The diffuser 12 can be fed conditioned air from the HVAC system 14 via ductwork 40 and a hood 42.

The balometer 50 includes a hood 52 that has an overall boxed rectangular configuration that is adapted to cooperate with the configuration (e.g., the 24×24 inch square configuration) of the diffuser 12. The pole 20 facilitates a user, indicated generally at 30, to maneuver the balometer hood 52 to fit squarely over the diffuser 12 and against the ceiling 16 along the diffuser perimeter so that all of the air discharged from the diffuser is directed through the balometer 50. In this position, the user 30 can activate the system 10, for example, via a trigger 24 on the handle 22.

The trigger 24 activates instrumentation and electronics of the balometer 50 via wireless communications, such as Bluetooth or single mode wireless connectivity. The instrumentation and electronics are at least partially hidden within the balometer hood 52 and therefore not shown in FIG. 1. The instrumentation and electronics obtains airflow measurement data that is transmitted wirelessly (again, e.g., via Bluetooth) to a smart device 26, such as a smart phone. The smart device 26 is equipped with an application ("HVAC balancing app") that is adapted to use the measurement data received from the balometer 50 to calculate or otherwise determine the volumetric flow rate of the air discharged from the diffuser 12.

This process can be repeated for all of the diffusers 12 of a given portion of the HVAC system, e.g., for a given building, room, zone, branch, etc. Once this process is completed for all of the diffusers 12, the measured flow rates can be compared to the desired or specified rate to determine whether any adjustments are required. These adjustments can be determined in a variety of manners. For example, the adjustments can be determined by a skilled user, such as a HVAC technician specializing in building balancing. This can be extremely cumbersome and prone to errors, especially where a large number of diffusers are involved.

Therefore, as another example, the HVAC balancing app installed on the smart device 26 can include a portion that determines the appropriate adjustments for each diffuser based on the measured flow rates and given the appropriate information regarding the HVAC system, or portion thereof, that is being balanced.

The system 10 is designed to facilitate ease of use for the user 30. Noting that ceiling-mounted HVAC diffusers 12 can be numerous and positioned at locations where access is difficult to obtain, such as above cubicles or other furniture. Because of this, the user 30 may have manually position and hold the system in place while the measurements are taken (see FIG. 1). Since commercial buildings can have hundreds of diffusers 12 that require balancing, this can be a burdensome and arduous task. The system 10 is constructed with these considerations in mind.

The balometer hood 52 is constructed of a molded, thin-walled construction formed with a lightweight polymer material, such as polypropylene. The balometer 50 can thus have a comparatively lightweight construction, such as 3 pounds or less, which can be less than half the weight of conventional balometers.

Figure 5:
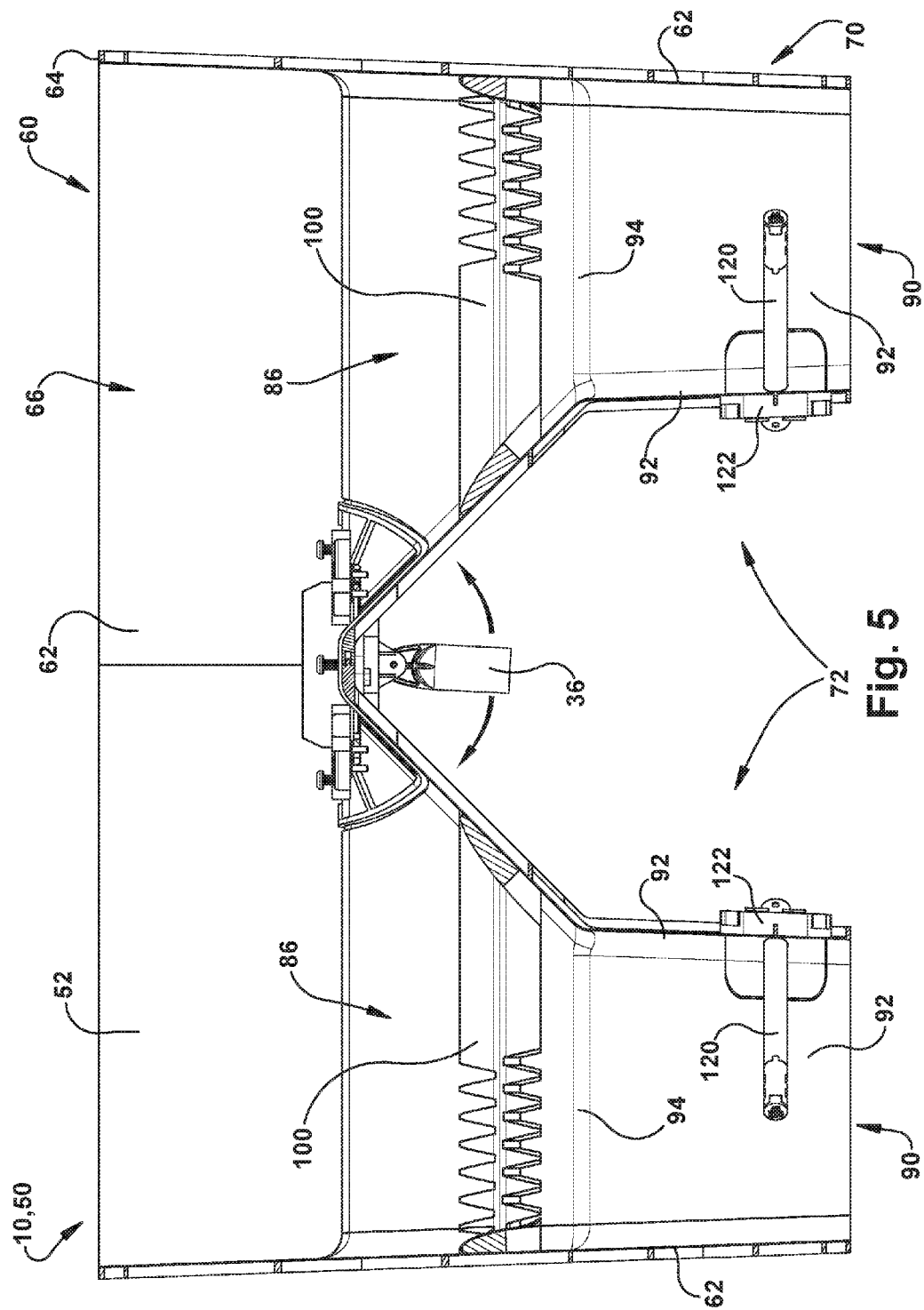
FIG. 5 is a side elevation view of the portion of the system illustrated in FIG. 2.
Figure 6:
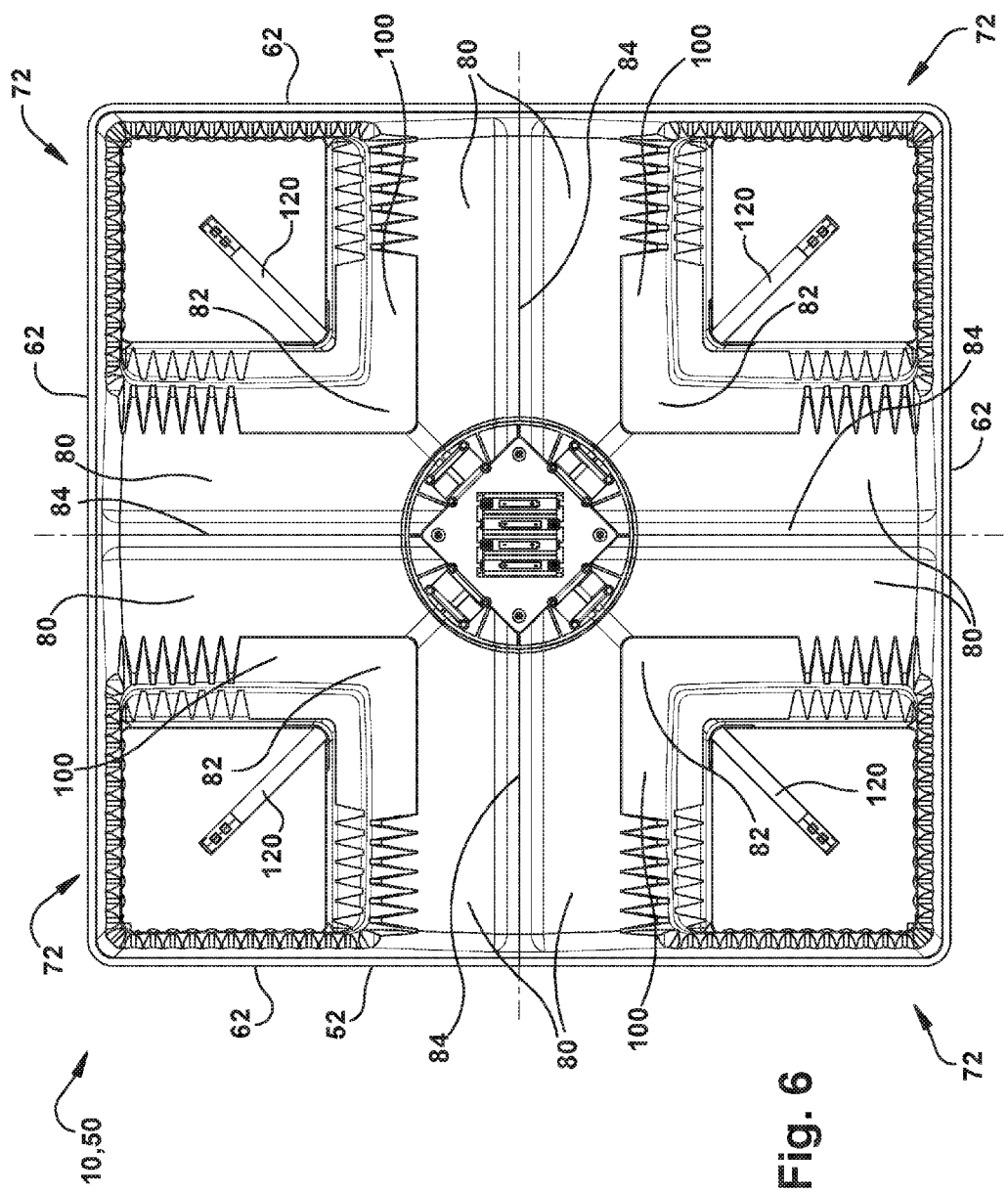
FIG. 6 is a top plan view of the portion of the system illustrated in FIG. 2.

The pole 20 can also be constructed of lightweight materials, such as carbon fiber or aluminum. The pole 20 is adjustable in length (telescopically via lock 28) so that the user 30 can maneuver the balometer 50 to reach ceilings of different heights and to reach over or around obstacles, such as furniture or cabinets. The gripping handle 22 affords the user 30 a comfortable and convenient grip with the trigger being positioned for ease of access and actuation. A base portion 32 of the pole 20 can also have an ergonomic construction for adding to the user's comfort and ease of use. To facilitate the user 30 manipulating the balometer 50 to the desired position in use, the balometer includes a centrally located swivel connector 36 on the underside of the hood 52. The swivel connector 36 (FIG. 5) allows the position of the pole 20 relative to the balometer hood 52 to be manipulated so that the user can access the diffuser 12 from different lines of approach.

Advantageously, the system 10 is also configured so that the user 30 is not required to hold the balometer 50 in place manually via the pole 20. Since the balometer hood 52 has an extremely lightweight construction, and since the pole 20 is telescopically adjustable, the pole can be positioned beneath the balometer hood 52 and its length adjusted so that the balometer 50 is supported by a rigid surface, such as the floor 18 or a surface of furniture, such as a desk, cabinet, or table. Additionally, to facilitate this function, the base portion 32 of the pole 20 can include an end portion or cap 34 that has a construction, such as a ribbed or knurled rubber construction, that will facilitate a good frictional "grip" with the surface upon which it is supported.

Supporting the system between the floor 18 and the ceiling 16 is illustrated generally in dashed lines at 20' in FIG. 1. In this application, the user 30 is relieved of the need to support the full weight of the system 10. Even if space or furniture does not permit the pole 20 to be placed at an angle sufficient to allow the pole to support the balometer 50 on its own, it still relieves the user 30 of some of the burden by supporting some of the weight while the user steadies the system 10, for instance, with one hand.

Referring to FIGS. 2-6, the hood 52 has an upper portion 60 with a generally square, box-shaped configuration with four intersecting side walls 62 that intersect each other and define a peripheral end 64 for being placed against the ceiling 16 (see FIG. 1). The side walls 62 also define an inner space 66 of the balometer hood 52. The inner space 66 of the upper portion 60 has an open configuration and leads to a downstream lower portion 70 of the hood 52, which is divided into quadrants 72, each of which is identical in configuration and structure.

The balometer hood 52 also includes a cover 150 for concealing and protecting at least a portion of the instrumentation and circuitry components (see FIG. 3) of the balometer 50, and for helping to direct airflow in the upper portion 60 of the balometer hood 52.

Each quadrant 72 is partially defined internally within the hood 52 by respective pairs of internal walls 80. The internal walls 80 each have a sloped or angled configuration and form roof-like pitches within the inner space 66 of the hood 52. Within each quadrant 72, the internal walls 80 intersect each other at right angles, defining a valley 82 at this intersection. Intersecting internal walls 80 of adjacent quadrants 72 define peaks 84 at the intersection. Each peak 84 extends perpendicularly from a respective one of the side walls 62 toward the center of the inner space 66 of the hood 52, where the peaks intersect each other. Each valley 82 bisects the intersecting pair of peaks 84 that define its quadrant 72. The valleys 82 also extend toward and intersect at the center of the inner space 66 of the hood 52.

In each quadrant 72, the intersecting internal walls 80 and the respective portions of the intersecting side walls 62 define an inlet portion 86 of the quadrant. Each quadrant 72 also includes a discharge channel 90 that extends downward (as viewed in FIGS. 2-6) from its associated the inlet 86. The discharge channels 90 have a generally tubular, rectangular configuration. Each discharge channel 90 is defined on two sides by intersecting portions of the side walls 62, and on two sides by intersecting channel walls 92 that extend generally perpendicularly inward from the side walls toward the center of the hood 52. At their upper extent, the channel walls 92 intersect lower edge portions 94 (see FIG. 4) of the intersecting internal walls 80 associated with that quadrant 72.

Figure 7:
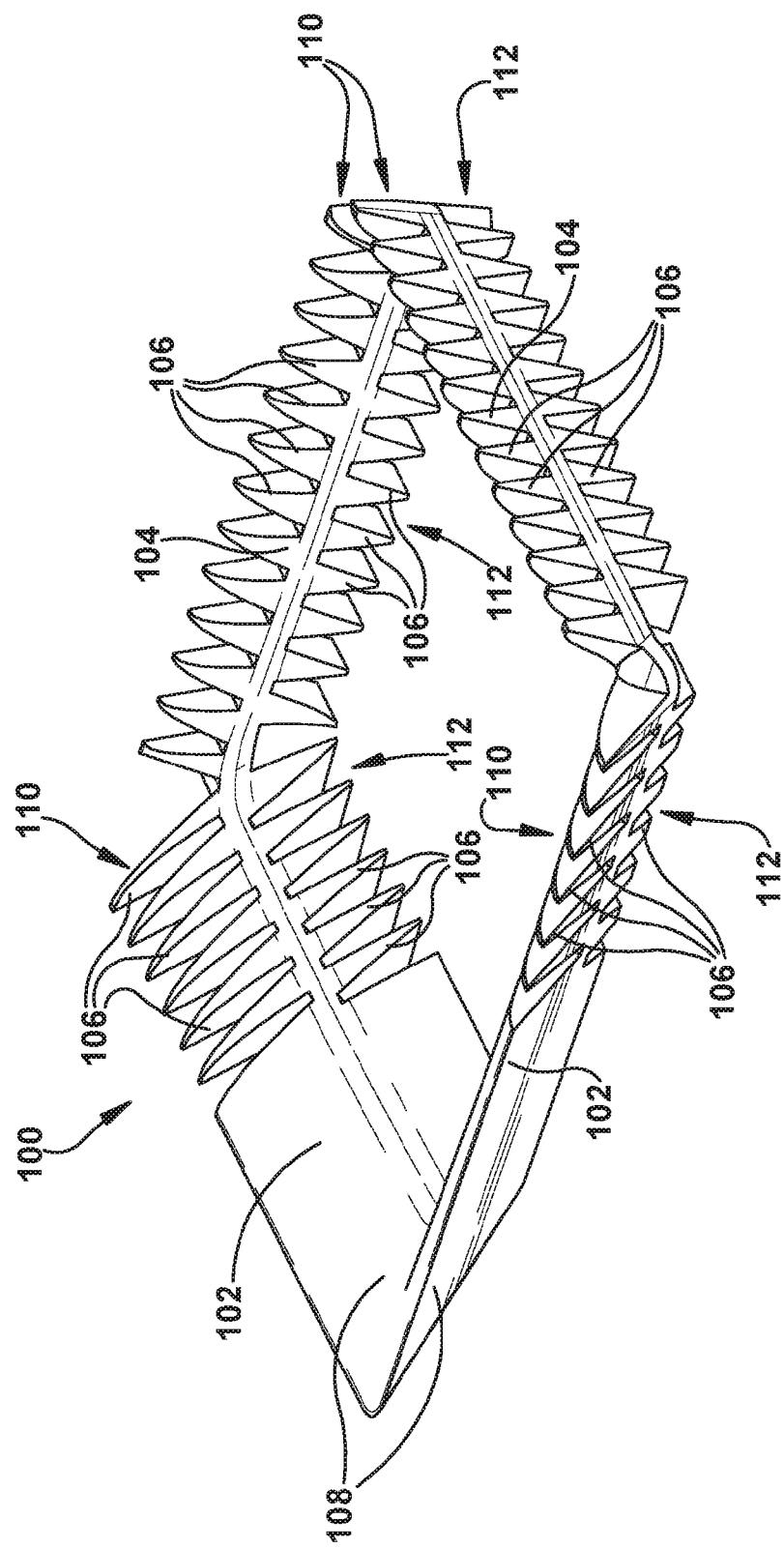
FIGS. 7-9 are perspective views of different portions of the system illustrated in FIG. 2.

Each quadrant 72 also includes a flow disrupting structure in the form of a turbulator 100 that is positioned in mating engagement with the inlet portion 86 of the quadrant at or near the mouth of the discharge channel 90. The turbulators 100 can, for example, be secured to the hood 52 via a snap fit connection. The turbulators 100 extend along at least a portion of the periphery of the inlet portion 86 of each quadrant, along the perimeter of the mouth of the discharge channel 90. An example of a turbulator 100 is illustrated in FIG. 7. In the example embodiment, the turbulator 100 is a singular part that includes a pair of inner legs 102 and a pair of outer legs 104 that intersect each other at right angles. The inner legs 102 mate with and follow the slope of the intersecting internal walls 80 of the quadrant 72, and the outer legs 104 mate with and follow the generally vertically extending side walls 62 of the quadrant 72 (see, e.g., FIG. 6).

Each leg 102,104 of the turbulator includes a plurality of tooth-shaped fins 106 arranged in saw tooth-like rows along the length of each leg. Each leg 102,104, includes an upper row 110 and a lower row 112 of fins 106. The fins 106 of the upper and lower rows are staggered and extend away from each other in opposite directions. On the outer legs 104, the fins 106 are spaced along the entire length of the legs. On the inner legs 102, the fins 106 are spaced along approximately half the length of each leg—the half that intersects with the adjacent outer leg 104. The portions 108 of the inner legs 102 that are free from fins 106 have a smooth, contoured configuration, with upper edges that merge smoothly with the internal walls 80.

Each fin 106 has a configuration that tapers from a widened base to a pointed tip. The fins 106 of both the upper and lower rows 110,112 of fins taper along the width of the fin as measured in the direction of the length of the legs 102,104. Additionally, the fins 106 of the upper row 110 also taper towards the wall 62,80 against which they abut.

Figure 8:
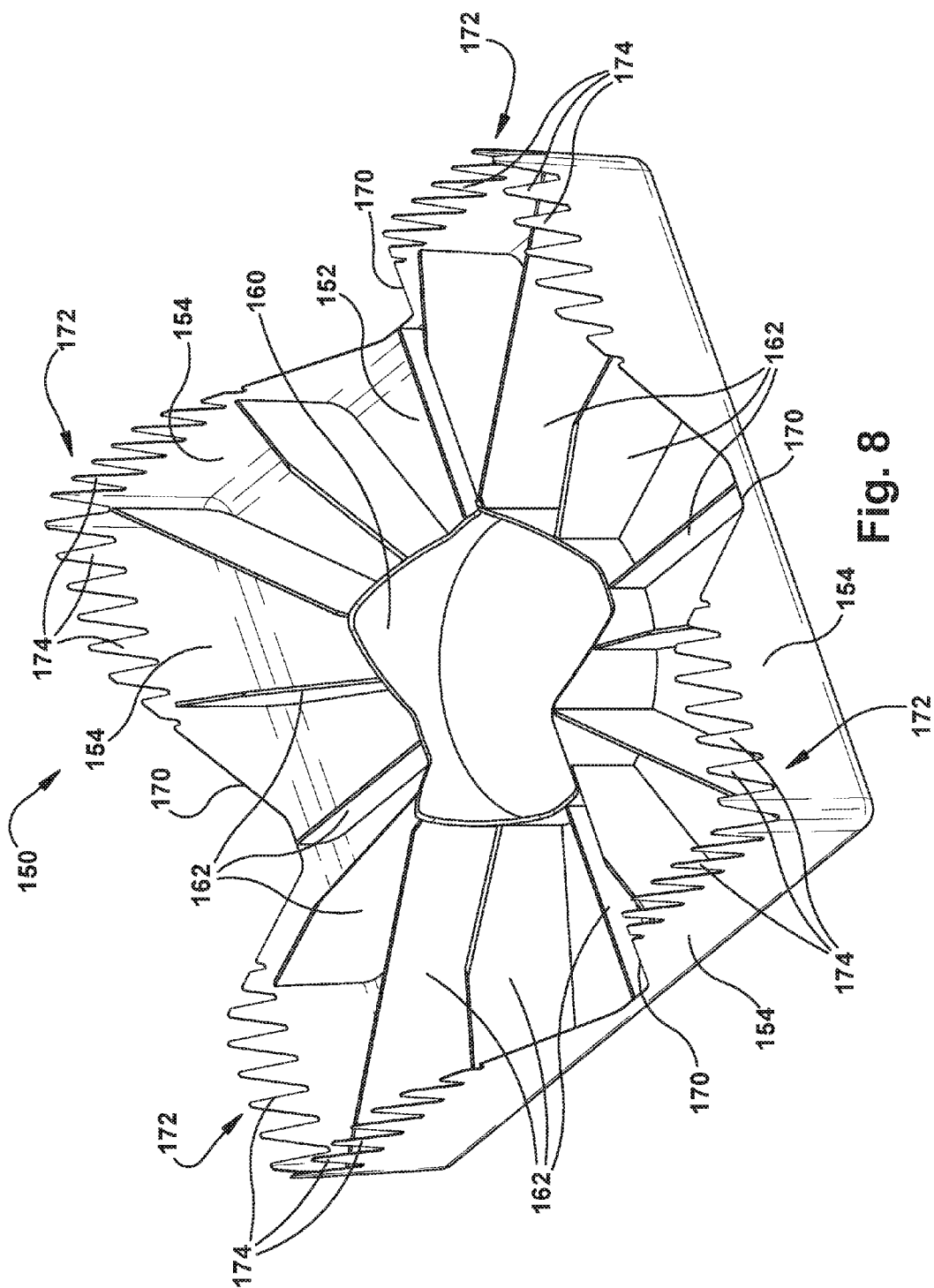

Referring to FIG. 8, which illustrates the cover 150 inverted for convenience, the cover has a generally square configuration with a planar square top wall 152 and four side walls 154 that extend perpendicularly from the top wall along its periphery. A cylindrical electronics covering wall 160 is located centrally on the top wall 152 extends perpendicularly from the top wall. A plurality of reinforcing ribs 162 extend from the wall 160 radially outwardly to the side walls 154.

The side walls 154 each include a centrally located, generally V-shaped notch 170 that has a profile that matches that of the intersecting internal walls 80 of each quadrant 72. The internal walls 80 can thus mate with the notches 170 and thereby help support the cover 150 when assembled with the balometer hood 52. Outside these notches 170, the side walls 154 have lower edge portions 172 that include a plurality of tooth-shaped notches that define a plurality of teeth 174. The teeth 174 extend along the length of the lower edge portions 172 and have a configuration and shape similar to the lower rows 112 of fins 106 on the turbulators 100. The positions and spacing of the teeth 174 on the side walls 154 of the cover 150 coincide with the portions 108 of the inner legs 102 of the turbulators 100 that are free from fins 106.

The balometer 50 also includes instrumentation and electronics for measuring conditions associated with ambient room conditions and the airflow through the diffuser 12. The balometer 50 includes airflow sensing probes 120 for sensing airflow through each quadrant 72 of the balometer hood 52. An airflow probe 120 is positioned in each discharge channel 90. In the example embodiment of FIGS. 2-6, the probe 120 enters the discharge channel 90 through the channel walls 92 at the location where the walls intersect. To facilitate this, the discharge channel 90 is fit with a probe support 122 that has portions that interlock with mating portions of the probe 122. The probe 120 extends through the probe support 122 and enters the discharge channel 90 through the intersecting channel walls 92. The probe 120 extends at an angle that bisects the intersecting walls 92, and is held in place by the probe support 122 so that an end portion 124 of the probe is positioned centrally and in the proper orientation within the discharge channel 90.

The airflow sensing probes 120 can have a variety of configurations. In the example embodiment disclosed herein, the probes 120 comprise hot point anemometer airflow sensing probes. Alternative probe configurations, such as a monometer probe, could also be used.

Figure 9:
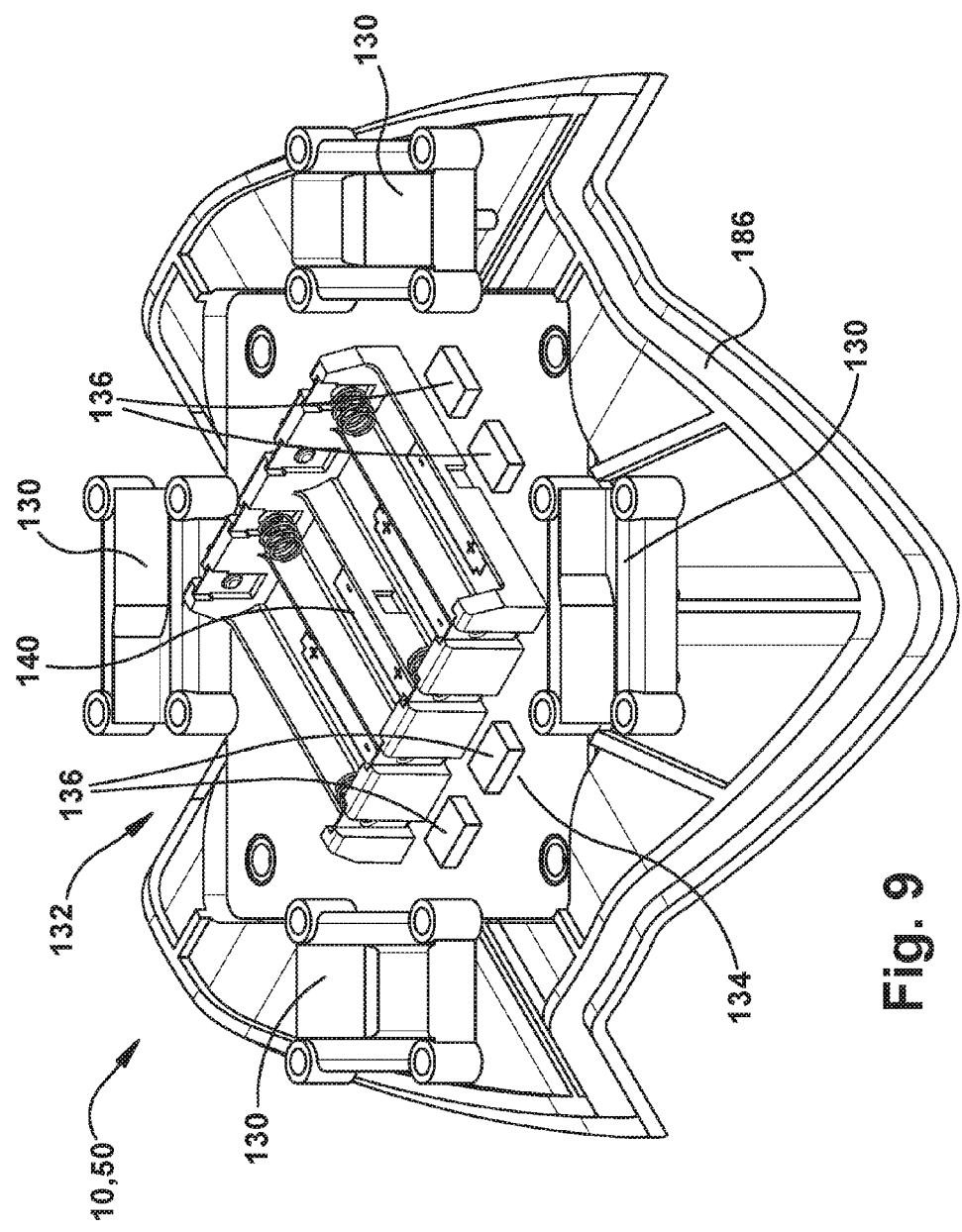

Referring to FIG. 9, located centrally in the upper portion 60 of the hood 52 beneath the cover 150 lie four differential pressure transducers 130, one per quadrant 72, for sensing the pressure differential between the air flowing through each quadrant and the ambient air into which the airflow is discharged. To do so, each pressure transducer 130 has a pressure port in fluid communication with the air pressure in the discharge channel 90 of the associated quadrant 72, and a port in fluid communication (e.g., via a tube) with the air pressure outside the balometer hood 52.

The instrumentation of the balometer 50 also includes temperature sensing components for measuring the temperature of the air flowing through the balometer. The temperature sensing components can, for example, be a resistive, e.g., thermocouple-type, element. According to one example, where the airflow probes 120 include hot point anemometers, the resistive elements of the anemometers themselves can also be used to measure the airflow temperature. Alternatively, one or more separate temperature sensors can be employed.

The pressure transducers 130 and the airflow probes 120 are connected electrically to an electronics unit 132 that is mounted to the balometer hood 52, centrally beneath the cover. The electronics unit 132 includes a circuit board 134 to which the pressure transducers 130 can be mounted. Alternatively, the pressure transducers can be mounted to the structure of the balometer 50. The electronics unit 132 includes various electronic components 136, such as processors, communication (e.g., Bluetooth) components, signal conditioning components, power and grounding circuits, communication buses, and any other components necessary to operate as described herein. The pressure transducers 130 and airflow probes 120 can be connected to the electronics unit 132, for example, via cables that interconnect with sockets mounted on the circuit board 134. The balometer 150 also includes a power supply 140, such as a battery pack, that is also located under the cover 150. The power supply can, for example, be mounted to the circuit board 134, on a side that is the same or opposite that to which the electronic components 136 are mounted.

Figure 10:
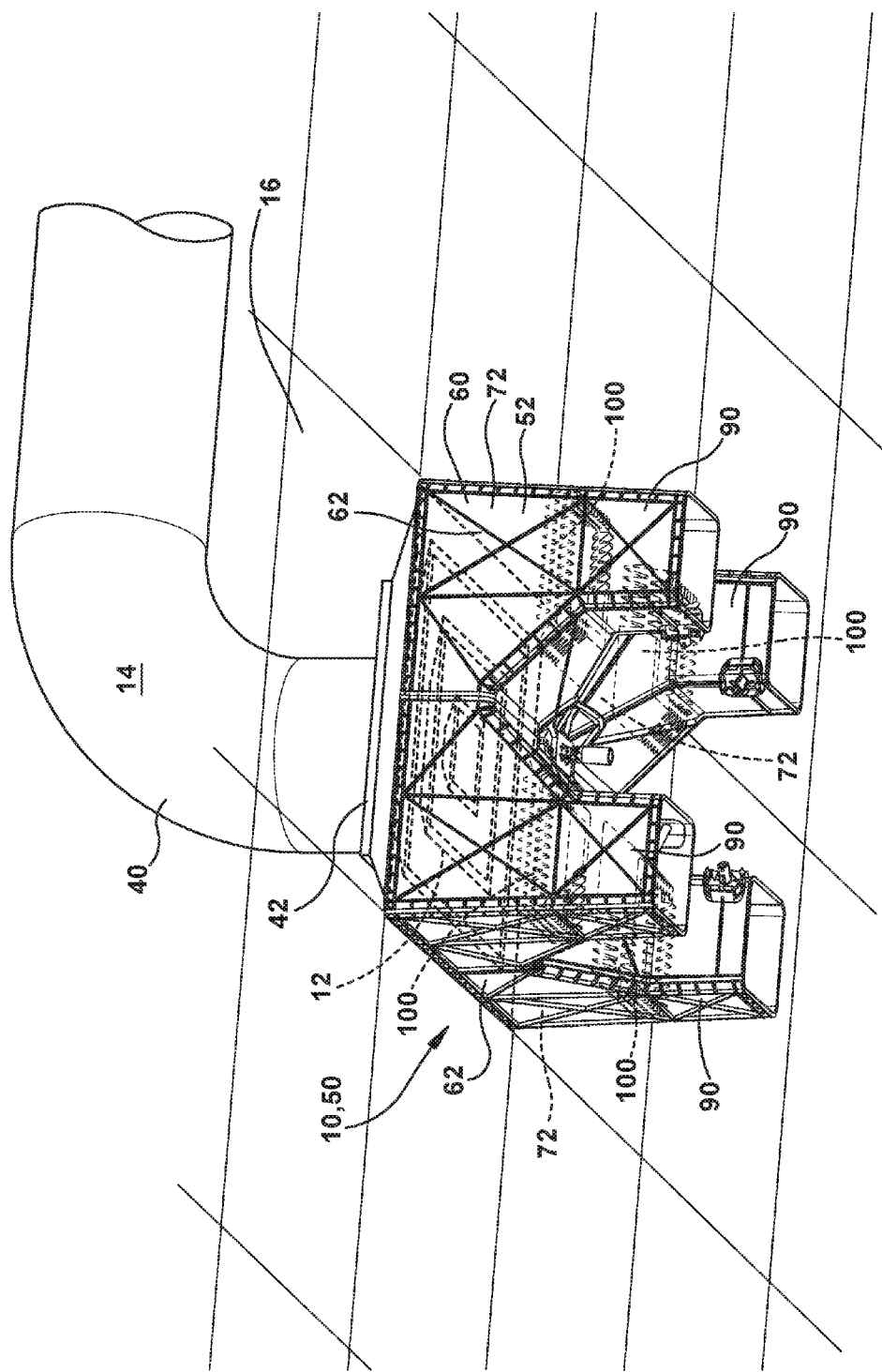
FIG. 10 is a perspective view illustrating an example implementation of the system of FIG. 1.

Referring to FIGS. 1 and 10, in operation, the user 30 positions the balometer 50 over the diffuser 12 using the pole 20. The upper portion 60 of the balometer hood 52 collects the air discharged from the diffuser 12 and directs it into the quadrants 72. The air directed into each quadrant 72 passes through the discharge channel 90 and over the sensor probes. The user 30 activates the balometer 50 via the trigger 24 on the handle 22, and the flow rate is measured via the sensor probes 120.

The electronics unit 132 transmits readings obtained from the probes 120 wirelessly to the smart device 26. The smart device 26 receives and processes the readings, and displays data related to the readings for the user to interpret. Since the readings from each sensor probe 120 is related to the flow through an associated discharge channel 90, and because the total air flow is divided between the discharge channels, calculating the total flow through the balometer 50 requires a summation of the flows through individual discharge channels.

Since the position of the sensor probe 120 in each discharge channel 90 is fixed, it is important that the bulk flow through each discharge channel is as uniform as possible so that an accurate flow measurement can be obtained. This holds true even if the airflow is distributed unevenly through the four quadrants 72. As long as the bulk flow through each discharge channel 90 is distributed evenly within that channel, the flow measurement for that quadrant will be accurate, as will the calculated total flow for the diffuser 12.

Conventional commercial HVAC ceiling mounted diffusers can have a variety of configurations. Examples of these diffuser configurations are illustrated in FIGS. 11A-11J, which are summarized in the following table:

| FIG. | Diffuser Configuration |
| --- | --- |
| 11A | 3-Cone, Square, 4-Way Diffuser (12a) |
| 11B | 2-Cone, Square, 4-Way Diffuser (12b) |
| 11C | 5-Cone, Square, 4-Way Diffuser (12c) |
| 11D | 3-Way, Square Diffuser (12d) |
| 11E | 3-Way, Rectangular Diffuser (12e) |
| 11F | 2-Way, Square Diffuser (12f) |
| 11G | T-Bar, Square, Plate Diffuser (12g) |
| 11H | 2-Way Diffuser (12h) |
| 11I | 1-Way Diffuser (12i) |
| 11J | 4-Way, Modular Diffuser (12j) |

The configuration of the diffuser will help dictate the airflow pattern in any balometer. The diffuser configuration will also determine whether the airflow is distributed evenly or unevenly across the balometer. All of the diffuser designs illustrated in FIGS. 11A-11J direct the discharged air in an outward and downward direction. Diffusers 12a-12c, 12g, and 12j direct the air in four directions and would theoretically direct the air evenly in terms of direction into the balometer hood. Diffusers 12d-12f direct the air in three directions and would therefore direct the air unevenly into the balometer hood. Diffusers 12h and 12i direct the air in two and one direction, respectively, and would therefore also direct the air unevenly into the balometer hood.

Testing has shown that, in conventional balometer hood designs, the bulk flow through the hood tends to be concentrated along the edges or side walls of the hood, while a portion of the air re-circulates toward the center of the hood, primarily in the upper regions of the hood. Depending on the configuration of the diffuser (see above), the bulk flow may not only be concentrated along the side walls, but also concentrated unevenly along the side walls Since the positions of the flow measuring devices in the conventional balometer hood are positioned at fixed locations in the hood, it is easy to see that the accuracy of the conventional balometer is somewhat left to chance. Knowing this, one skilled in the art can appreciate that the accuracy and reliability of the conventional balometer designs can come into question. There is a need to account for these issues.

According to the present invention, the balometer 50 is adapted to help account for these deficiencies. To do so, the balometer 50 is configured to divide the airflow from the diffuser 12 into the quadrants 72 in order to confine the divided flows to a more manageable space. The turbulators 100 in each quadrant 72 disrupt and mix the airflow to produce an even bulk flow through each discharge channel 90. This having been done, the airflow measurements taken in each discharge channel 90 are accurate and will produce an accurate calculation of total airflow through the diffuser.

For instance, in the example illustrated in FIG. 10, the diffuser 12 has a 3-cone square 4-way configuration and therefore directs the airflow toward all four side walls 62 of the balometer hood 52. Because of this, the bulk airflow, if left unchecked, would tend to flow along the side walls 62 toward the discharge channels 90. At the same time, the portion of the airflow that does not flow along the side walls 62 is collected and funneled toward the discharge channel 90 by the converging, sloped configuration of the internal walls 80. As the airflow is directed toward the discharge channel 90, however, the turbulators 100 redirect portions of the airflow, causing it to mix and distribute more uniformly across the discharge channel. Because the airflow is distributed uniformly across the channels 90, the small portions of the airflow that is sampled by the sensor probes 120 is much more likely to present an accurate measurement of the airflow through the discharge channel 90.

The combination of dividing the airflow from the diffuser 12 into the four quadrants 72 and mixing the airflow in each quadrant via the turbulators 100 helps produce these results. The accuracy of the balometer 50 can be affected by the amount of airflow resistance, or backpressure, that is introduced by placing the balometer in the airstream. Generally speaking, the lower the backpressure introduced by the presence of the balometer 50, the better. Mixing the flow to improve the uniformity of the airflow through the balometer 50, however, necessarily adds to the backpressure introduced by the balometer. To adequately mix the flow through the single flow channel of a conventional balometer hood would require a high degree of mixing and yet still may not result in even flow distribution. In fact, the magnitude of flow mixing necessary to produce uniform flow through the conventional balometer would likely create airflow disruptions of such a high magnitude that an undesirably high backpressure would result.

Advantageously, the balometer hood 52 of the present invention avoids this problem by first dividing the airflow into quadrants 72 of a more manageable space. In the quadrants 72, the amount of flow disruption required to adequately mix and distribute the airflow across the discharge channels 90 is minimized. Thus, the size of the turbulator fins 106, and the magnitude of the airflow disruption within the channels 90, can be kept at a minimum, which helps minimize the amount of backpressure created by the balometer 50.

Additionally, the fundamental difference in the manner in which calculations are performed in the conventional balometer versus the balometer 50 of the present invention facilitates this improved functionality. Conventional balometer hoods average airflow measurements taken from an array of elements distributed across the hood. The balometer 50, however, sums the individual airflows measured in each channel of the divided hood. Because of this, the balometer 50 of the present invention does not rely on airflow being directed from the diffuser into the balometer hood to the same degree as conventional balometers.

Different diffuser configurations (see FIGS. 11A-11J) are of little or no consequence to the ability of the balometer 50 to provide accurate airflow measurements. In a conventional balometer configuration, a non-uniform diffuser configuration could overload certain regions of the balometer hood, creating concentrated bulk flow paths that may or may not be accounted for in the averaged measurement. This is not the case with the balometer 50 of the present invention.

Because the balometer 50 is divided into quadrants 72 and relies on summing the airflow measured through each quadrant as opposed to the averaging the flow across the entire hood, there is no concern over a particular diffuser configuration causing an imbalance in certain regions of the balometer. This is because, in each quadrant 72, the airflow is funneled to the discharge channel 90 and mixed by the turbulators 100 to ensure uniform airflow distribution through the channel. Since each quadrant is measured separately, flow variances between quadrants will signal the level of imbalance across the diffuser 12. This can be due, for example, to an elbow leading to the diffuser 12, and the system 10 can compensate for any inaccuracy associated with the level of imbalance. The airflow measurement for each quadrant 72 will be accurate and, therefore, so will the total airflow measured by the system 10. Traditional air flow hoods use an averaging pitot tube with a signal differential pressure measurement, so they can neither detect these imbalances nor compensate for them.

To further improve the accuracy of the system 10, the application implemented by the smart device 26 can be adapted to compensate for different backflows realized by the balometer 50 for the different configurations of the diffuser and the HVAC system under test. To do this, compensation factors can be determined through air flow bench testing. The air flow bench can be configured to discharge air at a known volumetric flow rate through each of various diffuser configurations. This known flow rate can be compared to the flow rate measured via the balometer 50, and the error can be used to generate a compensation factor that will be programmed into the smart device application. The testing can be repeated to establish reliability and also in order to take into account other factors, such as compensation for any elbows in the ductwork leading to the diffuser and the distance between the elbow and the diffuser.

All of these factors can be programmed into the smart application. In use, the user 30 simply selects via the application on the smart device 26 the type of diffuser and any additional information, such as elbow distance, via the application graphical user interface (GUI). The application will take these factors into account by applying the appropriate compensation factor to the readings obtained from the sensors 120.

Additionally, the implementation of the application on the smart device allows for further efficiencies, such as a predictive balancing algorithm that indicates to the user 30 which flows (i.e., which diffusers 12) to measure, in which order, and how to adjust the dampers on each diffuser in order to obtain system balance. To do this, the user 30 may be queried to enter HVAC system information via the GUI, such as the number and type of diffusers 12 in a given room or for a given branch of the VAC system, and information on elbow distances for each diffuser. Given this information, the smart device 26 running the application can give the user 30 step-by-step instructions on how to balance the system in the most accurate and time efficient manner.

Figure 12A:
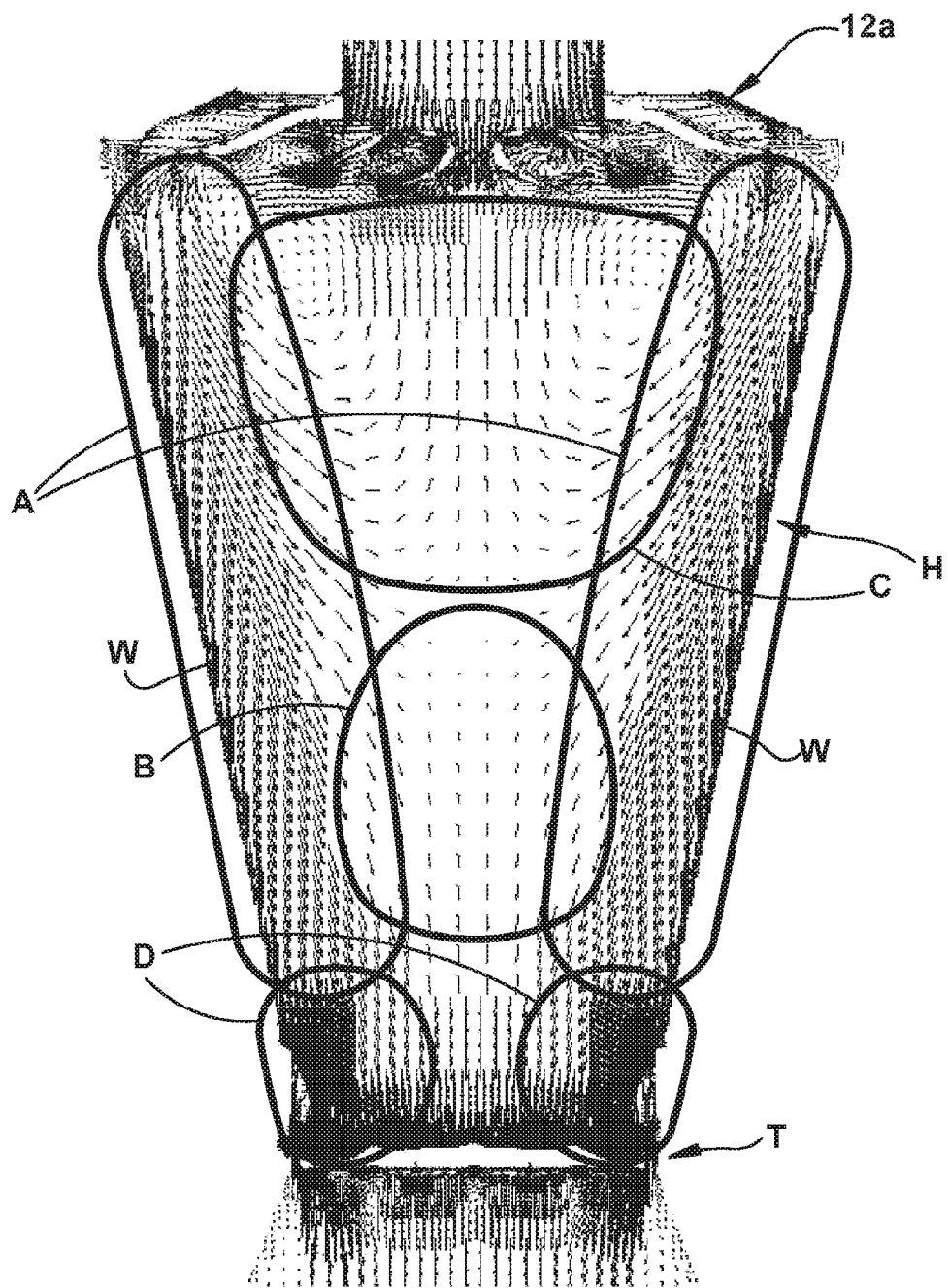
FIGS. 12A-12D illustrate comparative examples of the operation of the system of FIGS. 1-10 versus a prior art air flow hood.
Figure 12B:
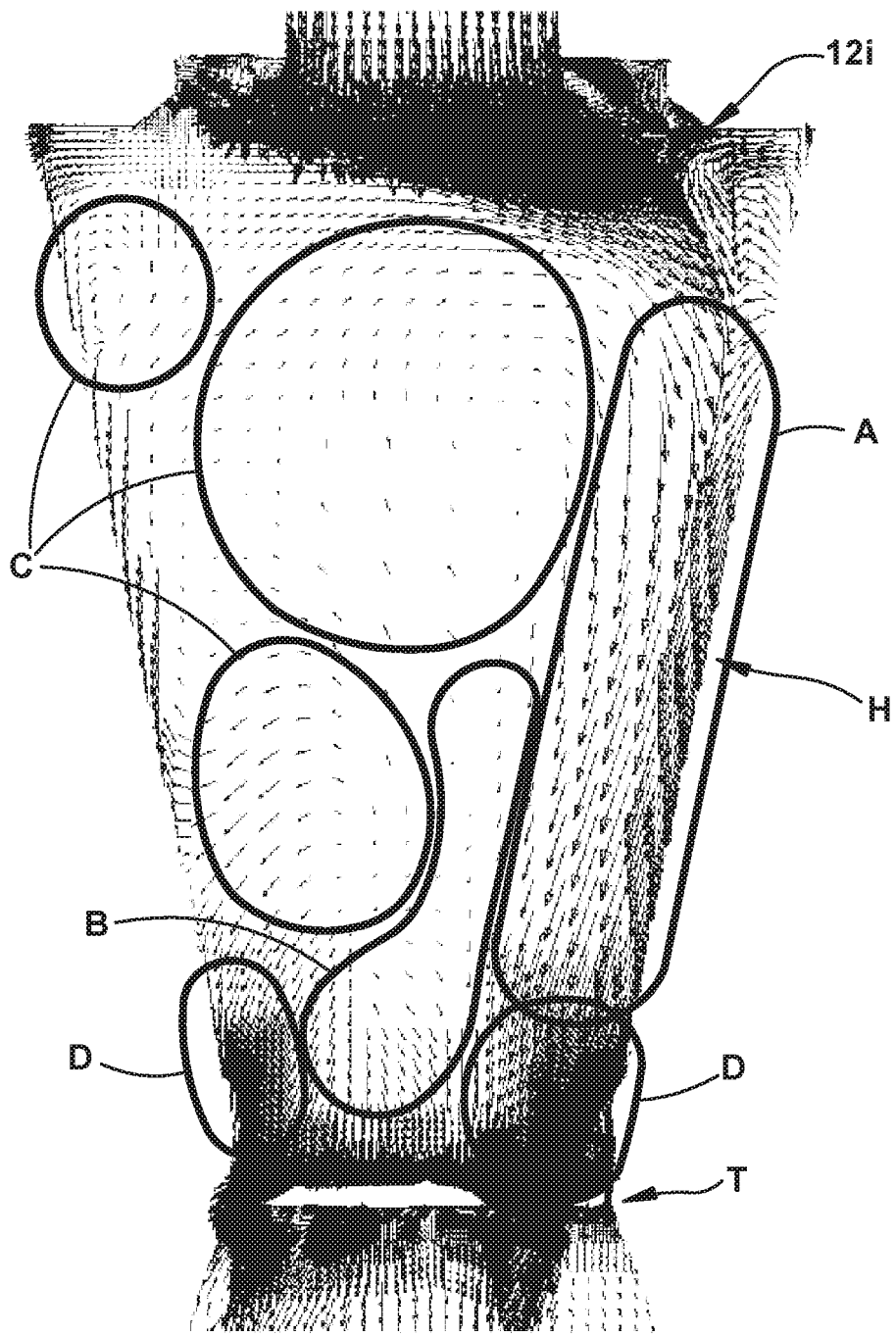
Figure 12C:
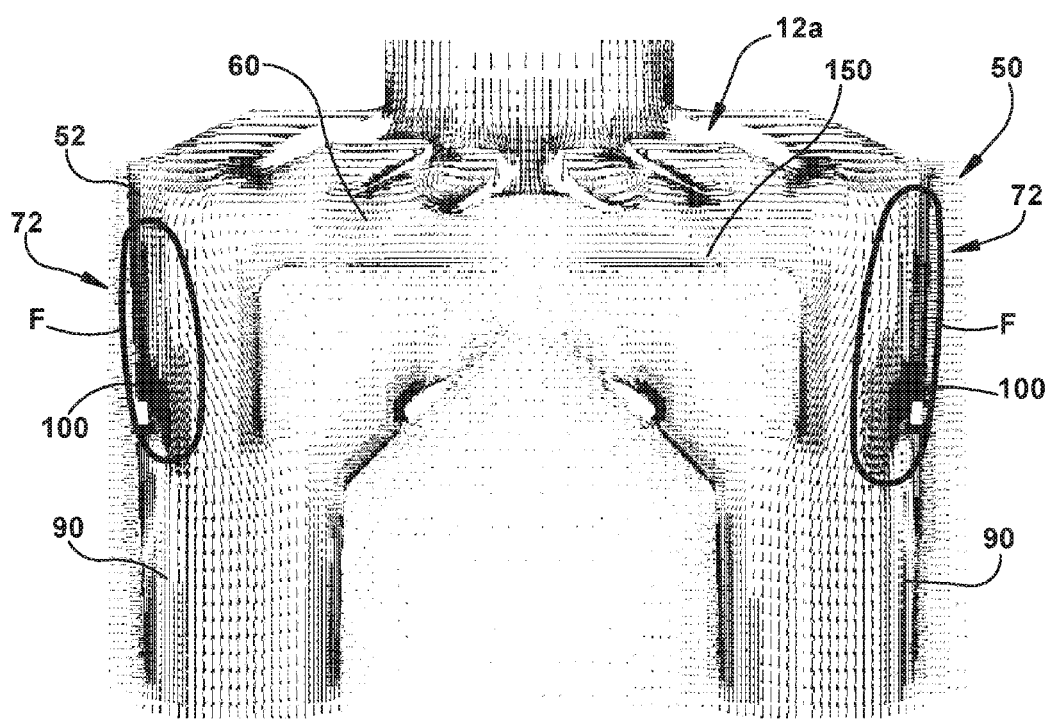
Figure 12D:
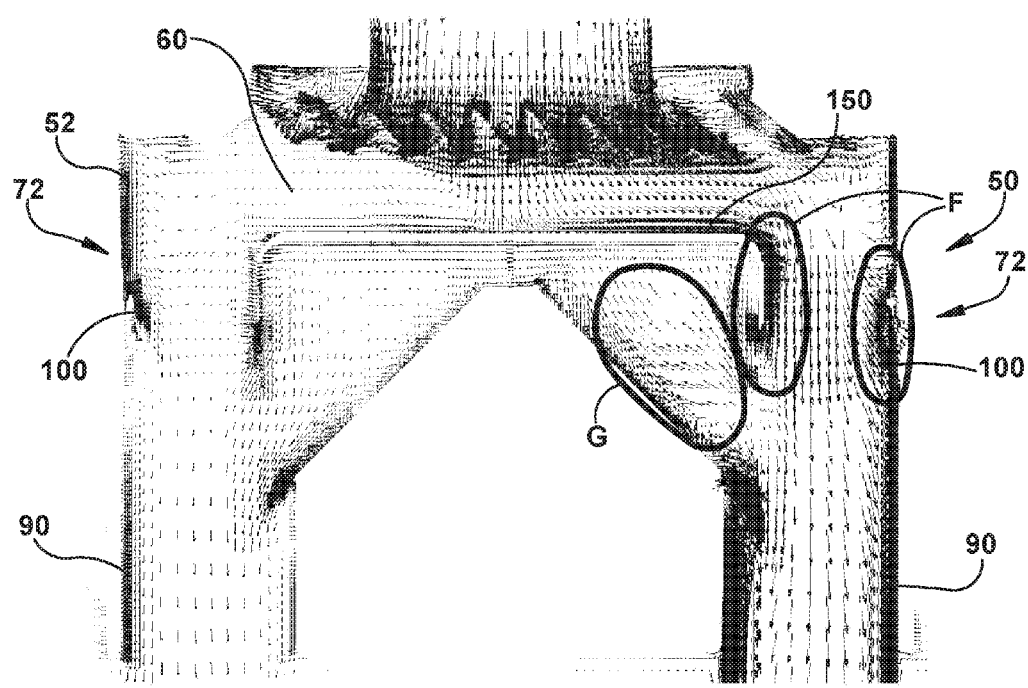

To illustrate the efficacy of the system 10, FIGS. 12A-12D compare and contrast flow patterns and velocity vectors obtained via computational fluid dynamics (CFD) modeling for a prior art air flow hood (FIGS. 12A-12B) versus the balometer 50 (FIGS. 12C-D). In FIGS. 12A-12D, the CFD modeling illustrates airflow with vector arrows. The direction in which the vectors arrows point is the direction of the modeled airflow. The size of the vector arrows indicates the velocity of the airflow. The density of the vector arrows in any particular area is indicative of the density or concentration of the modeled airflow in that area.

Figure 11A:
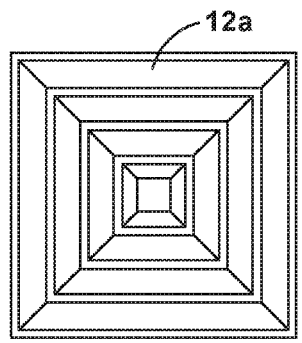
Figure 11B:
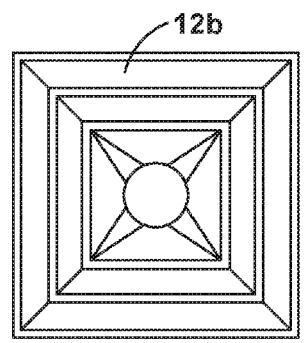
Figure 11C:
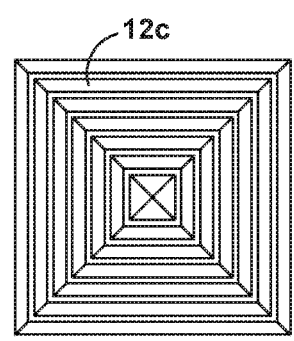
Figure 11D:
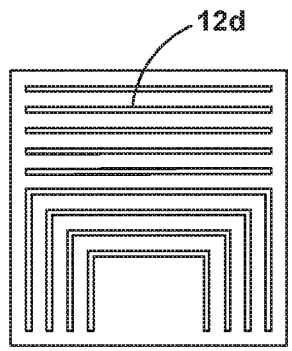
Figure 11E:
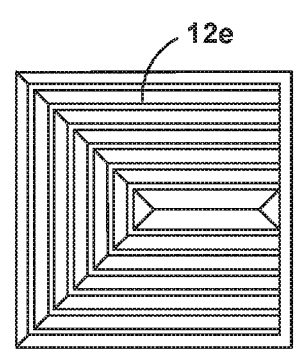
Figure 11F:
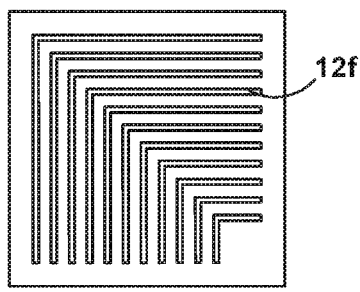
Figure 11G:
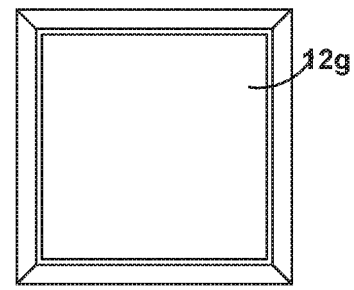

Referring to FIG. 12A, the conventional air flow hood H is positioned over a 3-cone, square, 4-way diffuser 12a (see FIG. 11A). In this example, the airflow is concentrated along the exterior walls W of the hood H, in the areas indicated generally at A in FIG. 12A. In these areas A, the concentrated airflow flows along the walls W toward the throat T of the air flow hood H. Additionally, in a central region of the hood, in the area indicated generally at B, airflow is less concentrated, but still flows toward the throat T. In an upper region of the hood, in the areas indicated generally at C, the airflow tends to re-circulate or swirl, as indicated by the swirling and upward pointing arrows of the CFD model. At or near the throat T, the flow is highly concentrated along the walls W, as indicated by the dense, dark collection of arrows, in the areas indicated generally at C.

From this, it will be appreciated that, for the conventional air flow hood H on the 3-cone, square, 4-way diffuser 12a, swirling in the upper central region C of the hood results in bulk airflow along the walls W all the way to and through the throat T, with low airflow concentrations through the central portion B of the hood. The averaging pitot tube manometer, intended to measure average velocities across the hood, is unlikely to accurately measure the velocity of the highly non-uniform airflow pattern illustrated in FIG. 12A.

Additionally, the swirling and recirculation in the upper region C of the hood H will inhibit flow through the register 12a, which will cause an increase in backpressure in the HVAC system. Increased backpressure will reduce the flow through the register 12a and through the air flow hood H. Thus, not only does the conventional air flow hood H suffer from the non-uniform flow patterns through the hood, it also suffers from the reduced flow that results from its use. Therefore, the accuracy and repeatability of the measurements obtained via the conventional air flow hood H is therefore questionable.

These issues exist with the use of the conventional air flow hood for other register types as well. Referring to FIG. 12B, the conventional air flow hood H is positioned over a square, one way diffuser 12i (see FIG. 11D. In this example, the airflow is concentrated along the exterior wall W of the hood H toward which the one-way diffuser 12i directs the air, as shown in the area indicated generally at A in FIG. 12B. As indicated generally at B, there is an area of less concentrated airflow toward the throat T, but this area is small and irregular. As indicated generally at C, there are many areas where swirling and recirculation takes place. As indicated generally at D, at or near the throat T, airflow is highly concentrated along the walls W, especially the wall along which the bulk airflow A occurs.

From this, it will be appreciated that the square, one way diffuser 12a directs the bulk airflow along one wall W of the conventional air flow hood H and also produces a high degree of swirling and recirculation throughout the hood. In this scenario, the averaging pitot tube manometer is unlikely to accurately measure the velocity of the highly non-uniform airflow pattern illustrated in FIG. 12B, and the high degree of swirling and recirculation will increase backpressure, which will reduce the flow through the air flow hood H. Again, the accuracy and repeatability of the measurements obtained via the conventional air flow hood H is therefore questionable.

Comparing FIGS. 12A and 12B, it is easy to see that it would be difficult for the conventional air flow hood H to provide accurate and reliable airflow measurements, given the difference in flow profiles and backpressures produced by various diffuser configurations. The balometer 50 of the present overcomes these problems.

FIGS. 12C and 12D illustrate CFD models for the balometer 50 implemented in scenarios that correspond to those illustrated in FIGS. 12A and 12B, respectively. As shown in FIGS. 12C and 12D, the presence of the hood 150 streamlines flow in the upper portion 60 of the balometer hood 52, which inhibits or prevents swirling and re-circulation. The hood 150 directs the streamlined airflow laterally into the quadrants 72, which then direct the airflow through the discharge channels 90.

In the case of the 4-way register 12a (FIG. 12C), airflow is discharged into the balometer hood 52 in substantially equal rates toward all four quadrants 72. Along the outer walls of the balometer hood 52, airflow does tend to concentrate, as indicated generally by the region identified at F in FIG. 12C, but the presence of the turbulators 100 introduce turbulence that mixes the flow entering the discharge channels 90. As shown in FIG. 12C, the airflow vectors in the discharge channels 90 are uniform in magnitude, direction, and density in the various regions of the balometer hood 52. There is little, if any, swirling or re-circulation in the hood 52 and the flow in the discharge channels 90 is highly uniform. The sensor probes (not shown), located in the discharge channels 90, would therefore produce substantially equal measurements that can be summed to calculate airflow through the balometer 50. The balometer 50 produces accurate measurements, and those accurate measurements would yield accurate and repeatable airflow calculations.

The one-way register 12i (FIG. 12D) does not significantly affect the accuracy of the balometer 50. Airflow is discharged into the balometer hood 52 in unequal rates, skewed toward one of the walls, and two of the quadrants 72 (one of which is shown in FIG. 12D). The airflow is therefore unequally distributed in the discharge channels 90. Along the outer walls of the balometer hood 52 on the strong side of the diffuser 12i, airflow does tend to concentrate, as indicated generally by the regions identified at F in FIG. 12D. Additionally, on this side, there is some recirculation under the hood 150, as indicated generally by the regions identified at F in FIG. 12D. The presence of the turbulators 100, however, introduce turbulence that mixes the flow entering the discharge channels 90. The flow in each of the discharge channels 90, again, is substantially uniform, even if unequal. The sensor probes (not shown), located in the discharge channels 90, would produce measurements that, while not equal, are accurate, and those accurate measurements would yield accurate and repeatable airflow calculations.

From the above description of the invention, those skilled in the art will perceive improvements, changes and modifications. These and other such improvements, changes and modifications within the skill of the art are intended to be covered by the appended claims.

What is claimed is:

1. An apparatus for measuring airflow through a diffuser of an HVAC system, comprising:
   a hood for being positioned adjacent the diffuser so that airflow discharged from the diffuser is directed into the hood, the hood being configured to divide and direct the airflow through a plurality of discharge channels; and
   sensor probes for independently measuring the airflow through each discharge channel.

2. The apparatus recited in claim 1, wherein the hood comprises flow disrupting structures for mixing and distributing the airflow evenly throughout the discharge channels.

3. The apparatus recited in claim 2, wherein the flow disrupting structures comprise turbulators.

4. The apparatus recited in claim 2, wherein each flow disrupting structure comprises a plurality of tooth-shaped fins arranged in saw tooth-like rows.

5. The apparatus recited in claim 2, wherein the flow disrupting structures are positioned adjacent inlets of the discharge channels.

6. The apparatus recited in claim 1, wherein the hood comprises internal walls that divide the airflow and funnel the airflow into the discharge channels.

7. The apparatus recited in claim 6, wherein the internal walls have a peaked configuration and slope in a converging manner toward the discharge channels.

8. The apparatus recited in claim 6, wherein the hood comprises an upper portion that defines an open space into which airflow is discharged, the internal walls and the discharge channels being positioned downstream of the upper portion.

9. The apparatus recited in claim 1, wherein the hood comprises four quadrants through which the divided airflow is directed, each quadrant including one of the discharge channels, the hood further comprising internal walls that help define the quadrants and that divide the airflow in the hood and funnel the airflow into the discharge channels.

10. The apparatus recited in claim 9, wherein each quadrant comprises at least one flow disrupting structure for mixing and distributing the airflow evenly throughout the discharge channels.

11. The apparatus recited in claim 10, wherein the flow disrupting structures are positioned adjacent inlets of the discharge channels.

12. The apparatus recited in claim 1, further comprising a planar surface, positioned in an upper portion of the hood, which streamlines and directs the airflow toward the discharge channels.

13. The apparatus recited in claim 12, wherein the planar surface reduces the volume of the upper portion and thereby helps prevent swirling in the airflow in the upper portion of the hood.

14. The apparatus recited in claim 12, wherein the planar surface is an upper portion of a cover under which instrumentation and electronics are located.

15. The apparatus recited in claim 14, wherein the instrumentation comprises at least one of pressure and temperature transducers.

16. The apparatus recited in claim 1, further comprising:
   electronics for interrogating the sensor probes and transmitting wireless signals comprising measurement data obtained via the sensor probes; and
   a smart device for receiving the wireless signals and processing the measurement data to provide airflow measurement data for the diffuser.

17. The apparatus recited in claim 16, wherein the smart device comprises one of a smart phone or tablet equipped with an application for processing the airflow measurement data and comprising a graphical user interface for displaying information related to the measurement data and the HVAC system.

18. The apparatus recited in claim 1, further comprising a pole mounting structure located centrally on an underside of the hood, the pole mounting structure being adapted to receive a pole that a user can manipulate to maneuver the hood to a desired position adjacent the diffuser.

19. The apparatus recited in claim 18, wherein the pole mounting structure comprises a swivel mechanism for permitting the pole to pivot relative to the hood.

20. The apparatus recited in claim 18, wherein the pole has a telescoping construction that permits the length of the pole to be adjusted in order to facilitate positioning the hood adjacent the diffuser while positioning a base of the pole against a surface so that the surface supports at least a portion of the weight of the hood.

21. The apparatus recited in claim 20, wherein the pole comprises a handle that the user can grasp to maneuver the hood, the handle comprising a trigger actuatable via finger to provide a wireless signal for activating system electronics.

22. The apparatus recited in claim 1, wherein the sensor probes comprise hot point anemometer sensors.

23. A method for measuring airflow through a diffuser of an HVAC system, comprising:
   gathering the airflow discharged from the diffuser;
   dividing the airflow;
   directing the divided airflow through a plurality of discharge channels; and
   independently measuring the airflow through each discharge channel.

24. The method recited in claim 23, further comprising disrupting the airflow to mix and distributing the airflow evenly throughout the discharge channels.

25. The method recited in claim 23, further comprising streamlining the airflow in the region close to the diffuser and directing the airflow toward structure for dividing the airflow.

* * * * *